(12) United States Patent
Martinson et al.

(10) Patent No.: US 10,049,267 B2
(45) Date of Patent: Aug. 14, 2018

(54) AUTONOMOUS HUMAN-CENTRIC PLACE RECOGNITION

(71) Applicant: TOYOTA JIDOSHA KABUSHIKI KAISHA, Toyota-shi, Aichi-ken (JP)

(72) Inventors: Eric Martinson, Mountain View, CA (US); David Kim, Mountain View, CA (US); Yusuke Nakano, Nagoya (JP)

(73) Assignee: TOYOTA JIDOSHA KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/057,032

(22) Filed: Feb. 29, 2016

(65) Prior Publication Data

US 2017/0249504 A1  Aug. 31, 2017

(51) Int. Cl.
*G06K 9/00* (2006.01)
*G06N 7/00* (2006.01)
(Continued)

(52) U.S. Cl.
CPC ... *G06K 9/00369* (2013.01); *G06F 17/30598* (2013.01); *G06F 17/30864* (2013.01); *G06K 9/00624* (2013.01); *G06K 9/4604* (2013.01); *G06K 9/6267* (2013.01); *G06N 7/005* (2013.01); *G06N 99/005* (2013.01); *G06T 7/0081* (2013.01)

(58) Field of Classification Search
CPC ............... G06K 9/00369; G06N 7/005
See application file for complete search history.

(56) References Cited

U.S. PATENT DOCUMENTS 8,565,538 B2   10/2013   Ranganathan
8,798,378 B1   8/2014   Babenko et al.
(Continued)

FOREIGN PATENT DOCUMENTS

JP   2000293694 A   10/2000
JP   2009003415 A   1/2009
(Continued)

OTHER PUBLICATIONS

Vasudevan et al., "Cognitive Maps for Mobile Robots—An Object based Approach," Robotics and Autonomous Systems 55.5, 2007 (6 pages).
(Continued)

*Primary Examiner* — Oneal R Mistry
(74) *Attorney, Agent, or Firm* — Patent Law Works LLP

(57) ABSTRACT

The novel technology described in this disclosure includes an example method comprising capturing sensor data using one or more sensors describing a particular environment; processing the sensor data using one or more computing devices coupled to the one or more sensors to detect a participant within the environment; determining a location of the participant within the environment; querying a feature database populated with a multiplicity of features extracted from the environment using the location of the participant for one or more features being located proximate the location of the participant; and selecting, using the one or more computing devices, a scene type from among a plurality of predetermined scene types based on association likelihood values describing probabilities of each feature of the one or more features being located within the scene types.

20 Claims, 10 Drawing Sheets

(51) Int. Cl.
  *G06N 99/00*  (2010.01)
  *G06K 9/46*   (2006.01)
  *G06K 9/62*   (2006.01)
  *G06T 7/00*   (2017.01)
  *G06F 17/30*  (2006.01)

(56) References Cited

U.S. PATENT DOCUMENTS

| | | | |
|---|---|---|---|
| 2007/0025637 A1* | 2/2007 | Setlur | G06K 9/3233 |
| | | | 382/276 |
| 2008/0240513 A1 | 10/2008 | Xie et al. | |
| 2010/0134611 A1 | 6/2010 | Naruoka et al. | |
| 2012/0209514 A1* | 8/2012 | Chrysanthakopoulos | G06F 17/3079 |
| | | | 701/431 |
| 2014/0149376 A1 | 5/2014 | Kutaragi et al. | |
| 2015/0172373 A1 | 6/2015 | Watanabe | |
| 2015/0178293 A1* | 6/2015 | Chrysanthakopoulos | G06K 9/00671 |
| | | | 701/410 |
| 2015/0292900 A1 | 10/2015 | Kitagawa | |
| 2015/0294193 A1 | 10/2015 | Tate et al. | |
| 2015/0317511 A1* | 11/2015 | Li | G06K 9/00288 |
| | | | 382/118 |
| 2016/0188977 A1* | 6/2016 | Kearns | G06K 9/00664 |
| | | | 348/113 |
| 2017/0262704 A1* | 9/2017 | Wnuk | G06F 17/30247 |

FOREIGN PATENT DOCUMENTS

| | | |
|---|---|---|
| JP | 2015114996 A | 6/2015 |
| JP | 2015204030 A | 11/2015 |
| WO | 2010004719 A1 | 1/2010 |
| WO | 2012046426 A1 | 4/2012 |
| WO | 2012176317 A1 | 12/2012 |

OTHER PUBLICATIONS

Krishnan et al., "A Visual Exploration Algorithm using Semantic Cues that Constructs Image based Hybrid Maps," Intelligent Robots and Systems (IROS), 2010 IEEE International Conference (6 pages).

Ranganathan et al., "Visual Place Categorization in Maps," IEEE International Conference on Intelligent Robots and Systems, 2011 (8 pages).

Zhou et al., "Learning Deep Features for Scene Recognition Using Places Database," Advances in neural information processing systems, 2014 (9 pages).

* cited by examiner

AUTONOMOUS HUMAN-CENTRIC PLACE RECOGNITION

BACKGROUND

The present disclosure relates to autonomous human-centric place recognition.

Today many autonomous computer systems rely on detection and recognition techniques for various different applications. In place or environment classification, systems are rapidly improving through the use of complex auditory, visual or multimodal learners. The challenge, however, is not in the classification of good data, but rather in overcoming poor sensor positioning at the time knowledge is required. For instance, a robot interacting with a person on a couch may see a large wall behind the person, but that wall may not contain adequate scene complexity to correctly classify the environment. Alternatively, even with a relatively open view of the environment, some rooms are multi-purpose, defying simple classification strategies. Further, when a robot is crossing from one room into the next, it often had difficulty identifying that transition and determining the correct context. When an autonomous agent, such as a robot, needs to make a decision based off the classification results, these "boundary conditions" become a significant barrier to deployment on a mobile sensor.

Place recognition or labelling is not a new field. It is also commonly called scene recognition, and/or place categorization. At this point, there are a variety of approaches, and sensors, that can be used for identifying the type of scene that is currently being observed. There are existing methods that categorize the type of objects in the environment and then learn the semantic place label associated with those objects, such as that described by Shrihari Vasudevan, Stefan Gächter, Marc Berger & Roland Siegwart, "Cognitive Maps for Mobile Robots—An Object based Approach", Intelligent Robots and Systems (IROS), San Diego, USA, 2007.

There are also existing methods that do straight image-based classification; new work in deep learning, for instance utilizes large image databases now available online for a single viewpoint classification, as described by Bolei Zhou, Agata Lapedriza, Jianxiong Xiao, Antonio Torralba, and Aude Oliva, "Learning Deep Features for Scene Recognition using Places Database", NIPS 2014.

The foregoing single observation classification methods, however, are unable to identify the place label by themselves when the camera or sensor is poorly positioned. They also commonly fail when categorizing places that contain more than one environment, answering one environment or the other, and sometimes neither.

To correct for these errors in sensor positioning, the robotics community has focused on fusing sensor data over physical space. One possibility discussed is to use commonly available location sensors, e.g. GPS, to compare the picture location to a previously labeled map. Then, the combination of GPS predicted location and classified place label are used to estimate the place. This approach, which is discussed in U.S. Pat. No. 8,798,378 by Boris Babenko, Hartwig Adam, John Flynn, and Hartmut Neven, titled Scene Classification for Place Recognition, improves problems with poorly positioned sensors, but is designed for larger place categories like city, or tourist attraction. It does not solve labelling challenges with small indoor environments, transition regions, or multi-purpose spaces.

Another form of sensor fusion is to construct a topological map of the environment. The idea, as described by Aravindhan K Krishnan and K Madhava Krishna, "A Visual Exploration Algorithm using Semantic Cues that Constructs Image based Hybrid Maps", Intelligent Robots and Systems (IROS), Taipei, Taiwan, 2010, is to take advantage of a video stream from a mobile sensor, rather than the single image approach, by seeking for images that are significantly different from the ones that came before them. While mapping the environment, the robot clusters regions of similar class and self-identifies change points between one room and the next. The resulting map is more of a topological graph. Although this method shows improvement for poor sensor positioning, it assumes that each room has a homogeneous purpose, and that transitions are well defined—something that is often not true in real environments. A further similar approach for improving a classification algorithm without generating the actual map is described in U.S. Pat. No. 8,565,538 by Ananth Ranganathan, titled Detecting and Labeling Places using Runtime Change-point Detection.

An alternative fusion method is the occupancy grid. Ananth Ranganathan and Jongwoo Lim in their work titled "Visual Place Categorization in Maps", Intelligent Robots and Systems (IROS), San Francisco, USA, 2011, describe using each measurement from a place recognition algorithm to update an occupancy grid as the robot moves through the space. Importantly, each measurement update reflects the region of view observed by the camera, attempting to learn a classification for both obstacles and empty space in the occupancy grid. As with topological maps, this sensor fusion strategy helps overcome basic directionality problems, particularly from cameras, but it also introduces additional problems. First, the map does not directly answer the place recognition question. Given a map, how does a robot identify the place label for use in its application? This group does not apply the map to any application—so it does not address how to best utilize the resulting fused representation in human robot interaction or any other domain. The second problem is that this map is a static representation focused on point cloud data. It is difficult to make changes in real time to a map representation, or incorporate non-point cloud data, either of which may aid in reducing ambiguity in multipurpose environments.

SUMMARY

To improve the usability of place recognition for autonomous implementations, such as a human-robot interaction, this document discloses an innovative human-centric approach in which the detected position of an interaction participant (e.g. human) is used to query a database of accumulated evidence. In the context of human robot interaction, this approach can identify relevant information needed by the robot based in part on the functionality of the place in which the person is located. This aspect can be used to stabilize the boundary conditions that otherwise make place recognition by a mobile robot unusable.

According to one innovative aspect of the subject matter described in this disclosure, a system includes one or more processors and one or more memories storing instructions that, when executed by the one or more processors, cause the system to perform operations including capturing sensor data using one or more sensors describing a particular environment, processing the sensor data using one or more computing devices coupled to the one or more sensors to detect a participant within the environment, determining a location of the participant within the environment, querying a feature database populated with a multiplicity of features extracted from the environment using the location of the participant for one or more features being located proximate the location of the participant, and selecting, using the one or more computing devices, a scene type from among a plurality of predetermined scene types based on association likelihood values describing probabilities of each feature of the one or more features being located within the scene types.

In general, another innovative aspect of the subject matter described in this disclosure may be embodied in methods that include capturing sensor data using one or more sensors describing a particular environment; processing the sensor data using one or more computing devices coupled to the one or more sensors to detect a participant within the environment; determining a location of the participant within the environment; querying a feature database populated with a multiplicity of features extracted from the environment using the location of the participant for one or more features being located proximate the location of the participant; and selecting, using the one or more computing devices, a scene type from among a plurality of predetermined scene types based on association likelihood values describing probabilities of each feature of the one or more features being located within the scene type.

Other aspects include corresponding methods, systems, apparatus, and computer program products for these and other innovative aspects.

These and other implementations may each optionally include one or more of the following features and/or operations. For instance, the features and/or operations include: executing one or more autonomous routines based on the selected scene type; generating the association likelihood values based on times of day; that the association likelihood values are classification scores respectively describing the probabilities of the features belonging to the scene types; prior probabilities of classifying the scene types correctly using the features, N-dimensional locations with respect to an arbitrary reference point, and sizes; that the association likelihood values are probabilities computed using $$P(ff \mid s) = \eta \prod_i P(s \mid ff_i) P(ff_i);$$

prior to querying the feature database, scanning the environment using the one or more sensors, extracting the multiplicity of features of the environment using sensor data provided by the one or more sensors responsive to scanning the environment, and populating the feature database with the multiplicity of features; that selecting the scene type includes generating a gradient for an area in a vicinity of the participant, determining a directionality based on the gradient, and selecting the scene type further based on the directionality of the gradient; that at least one of the one or more sensors is an RGB-D camera; and that the participant is a human.

The novel detection technology presented in this disclosure is particularly advantageous in a number of respects. For example, incorporating a human's location into the place recognition equation maximizes the relevance of the answer for human robot interaction. In particular, having a human location and a database designed for a targeted search, enables disambiguation of complex scenes for human-robot interaction and improving place recognition performance in scenarios involving directional sensors, multi-purpose rooms (e.g. studio apartment, kitchen/dining, bedroom/office, etc.), and transition regions.

Additionally, as opposed to only utilizing a fixed map that maps the fixed locations of the objects within a given environment, which typically become inaccurate over time due to the objects shifting locations, use of the various spaces within the environment changing, etc., the detection technology generates a dynamic, contextually and temporally relevant depiction of the environment, which automated devices such as a robot may use for more informed computational interaction with humans. More specifically, organizing the place recognition evidence in a searchable database enables a more dynamic classification algorithm that can better reflect a dynamic environment. For instance, searching by the time of the expected interaction can reveal time varying aspects of a room, something that the human will recognize immediately. Also, the proximity of the recognized objects to the human are incorporated in the place recognition score, and local place gradients can be estimated to guide robot motion and/or attention during an interaction. It should be understood that the foregoing advantages are provided by way of example and that the technology may have numerous other advantages and benefits.

The disclosure is illustrated by way of example, and not by way of limitation in the figures of the accompanying drawings in which like reference numerals are used to refer to similar elements.

DESCRIPTION

Figure 1:
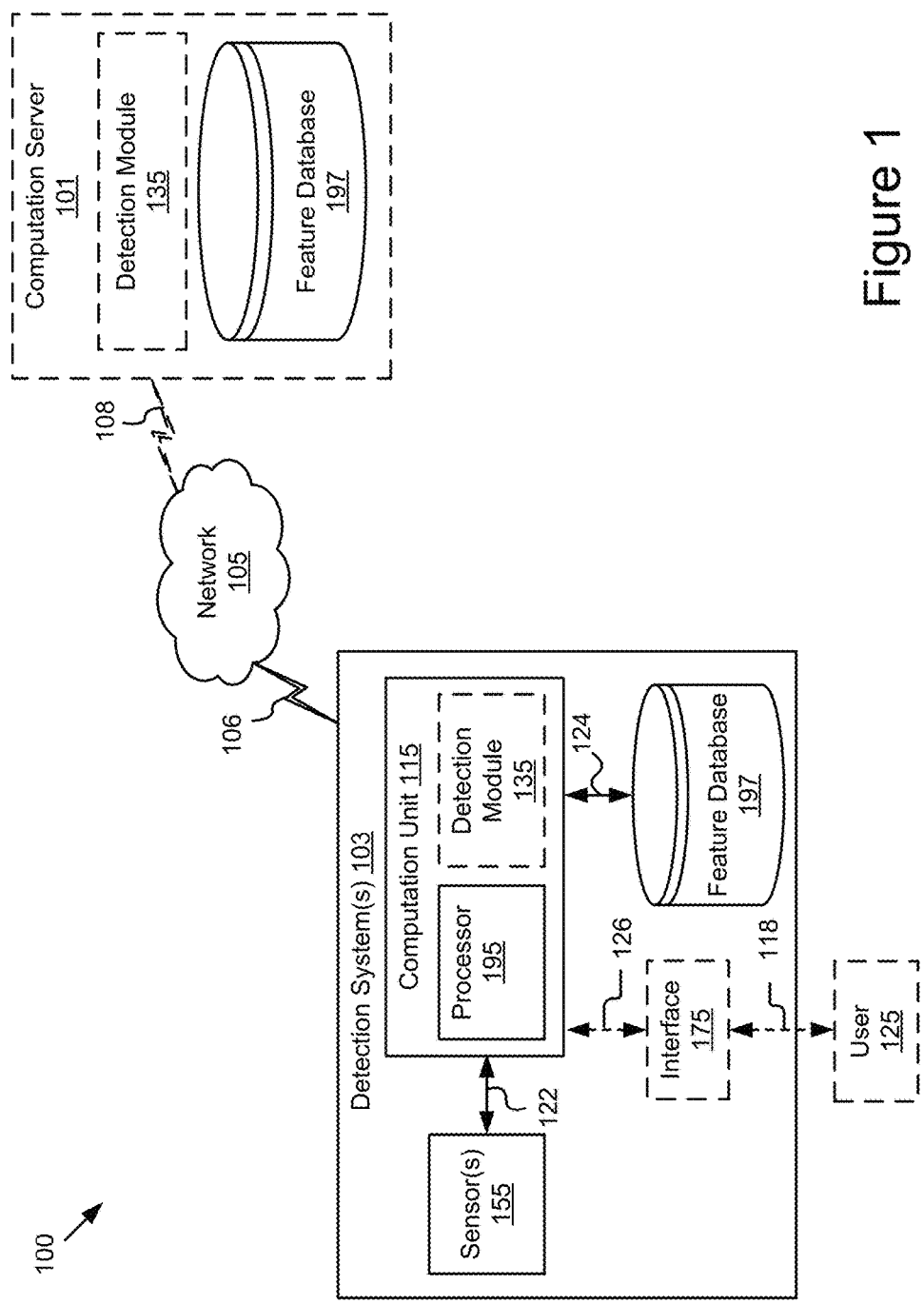
FIG. 1 is a block diagram of an example system for autonomous human-centric place recognition.

FIG. 1 is a block diagram of an example system 100 for autonomous human-centric place recognition. As illustrated, the system 100 may include a computation server 101 and/or a detection system 103 that may be accessed and/or interacted with by a user 125 (as depicted by line 118). Depending on the implementation, computation may be distributed across and/or dynamically shifted between two or more computing systems (e.g., the computation server 101 and the detection system 103, two or more detection systems 103), may be performed independently by the detection system 103, etc. As such, the system 100 may or may not include a computation server 101.

In embodiments where a computation server 101 is included, the detection system 103 and the computation server 101 may be communicatively coupled via a network 105 via signal lines 106 and 108, respectively. For example, the detection system 103 and the computation server 101 may be communicatively coupled to each other via the network 105 to exchange data, such as sensor data, feature data, recognition data, etc. The signal lines 106 and 108 in FIG. 1 may be representative of one or more wired and/or wireless connections. As a further example, the detection system 103 may transmit sensor data to the computation server 101 for processing and the computation server 101 may process the data as described herein to detect and recognize objects and send data and/or results describing the recognized objects to the detection system 103 for use thereby during operation. In embodiments where a computation server 101 is not included, the detection system 103 may operate autonomously or in conjunction with other detection systems 103 (not visible) to detect and recognize objects, scenes, human locations, etc. For instance, a detection system 103 may be networked via a computer network with other similar detection systems 103 to perform the computations discussed herein.

While FIG. 1 depicts a single detection system 103 and computation server 101, it should be understood that a variety of different system environments and configurations are possible, contemplated, and within the scope of the present disclosure. For instance, some embodiments may include additional or fewer computing devices, services, and/or networks, and may implement various functionality locally or remotely on other computing devices. Further, various entities may be integrated into to a single computing device or system or distributed across additional computing devices or systems, etc. For example, the detection module 135 may be stored in, executable by, and distributed across a combination of computing devices and/or systems or in one computing device and/or system.

The network 105 may include a standard type network, wired or wireless, and may have any number of configurations, such as a star configuration, token ring configuration, or other known configurations. The network 105 may include one or more local area networks ("LANs"), wide area networks ("WANs") (e.g., the Internet), virtual private networks ("VPNs"), peer-to-peer networks, near-field networks (e.g., Bluetooth™, cellular networks (e.g., 3G, 4G, other generations), and/or any other interconnected data path across which multiple computing nodes may communicate. Data may be transmitted in encrypted or unencrypted form between the nodes of the network 105 using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOW), file transfer protocol (FTP), WebSocket (WS), wireless access protocol (WAP), various messaging protocols (SMS, MMS, XMS, IMAP, SMTP, POP, WebDAV, etc.), or other known protocols.

The detection system 103 may be representative of or included in an autonomous computing system capable of perceiving, recognizing, and interpreting the significance of objects within its environment to perform an action. For example, the detection system 103 may be representative of or incorporated into an intelligent car having the capability of recognizing a particular driver or passenger inside the car. In further examples, the detection system 103 may be representative of or incorporated into a social robot that can cooperate with humans and/or other robots to perform various tasks, or an autonomous system operating in populated environments. In some embodiments, the detection system 103 may be incorporated in other systems as a component for detecting and recognizing objects. For instance, the detection system 103 may be incorporated into a client device such as a gaming system, television, mobile phone, tablet, laptop, workstation, server, etc. For example, the detection system 103 may be embedded in a machine or computer system for determining if a certain person or persons are present at a particular location and the machine or computer system can turn on/off or execute a particular program if that certain person or persons are present at the particular location.

In some embodiments, the detection system 103 may include one or more sensor(s) 155, a computation unit 115 that includes a processor 195 (which may represent one or more processors) and an instance of the detection module 135, a feature database 197, and/or an interface 175. As depicted, the sensor(s) 155 are communicatively coupled to the computation unit 115 via signal line 122. The feature database 197 is communicatively coupled to the computation unit 115 via signal line 124. The interface 175 is communicatively coupled to the computation unit 115 via signal line 126. In some embodiments, an instance 135 of the detection module, or various components thereof, can be stored on and executable by the computation server 101, as described elsewhere herein. The instances of the detection module 135 are also referred to herein individually and/or collectively as the detection module 135.

Although each of the computation unit 115, sensor(s) 155, feature database 197, and interface 175 may be depicted and/or referred to herein in the singular or plural, it should be recognized that the detection system 103 can include any number of computation units 115, sensors 155, storage devices 197 and/or interfaces 175. Furthermore, it should be appreciated that depending on the configuration the detection system 103 may include other elements not shown in FIG. 1, such as an operating system, programs, various additional sensors, motors, movement assemblies, input/output devices like a speaker, a display device, a transceiver unit and an antenna for wireless communication with other with other devices (e.g., the computation server 101, other detection systems 103 (not shown), any other appropriate systems (not shown) communicatively coupled to the network 105, etc.

The sensor(s) 155 may include one or more sensors configured to capture light and other signals from the surrounding environment and to generate and/or processes sensor data, such as depth data, therefrom. For instance the sensor(s) 155 may include a range camera, such as but not limited to an RGB-D camera, a stereo camera, a structured light camera/scanner, time-of-flight camera, interferometer, modulation imager, a laser rangefinder, a light-field camera, an intensified CCD camera, etc., although it should be understood that other types of sensors may be used, such as but not limited to an ultrasound sensor, a color camera, an infrared camera, etc. In some embodiments, the sensor(s) 155 and/or detection system 103 may include a combination of different types of sensors, such as accelerometers, gyroscopes, thermometers, barometers, thermocouples, microphones, or other conventional sensing devices. Swiss Ranger sensor by MESA Imaging, Kinect sensor by Microsoft, various stereo vision systems, etc., are further non-limiting examples of cameras that the sensor(s) 155 may include. The sensor(s) 155 may be incorporated into the computation unit 115 or may be a disparate device that is coupled thereto via a wireless or wired connection.

In various embodiments, the sensor(s) 155 may generate and send the sensor data (e.g., depth data describing distance information associated with objects captured by a sensor 155) to the computation unit 115 and/or the computation server 101 for processing, as described elsewhere herein.

Figure 2A:
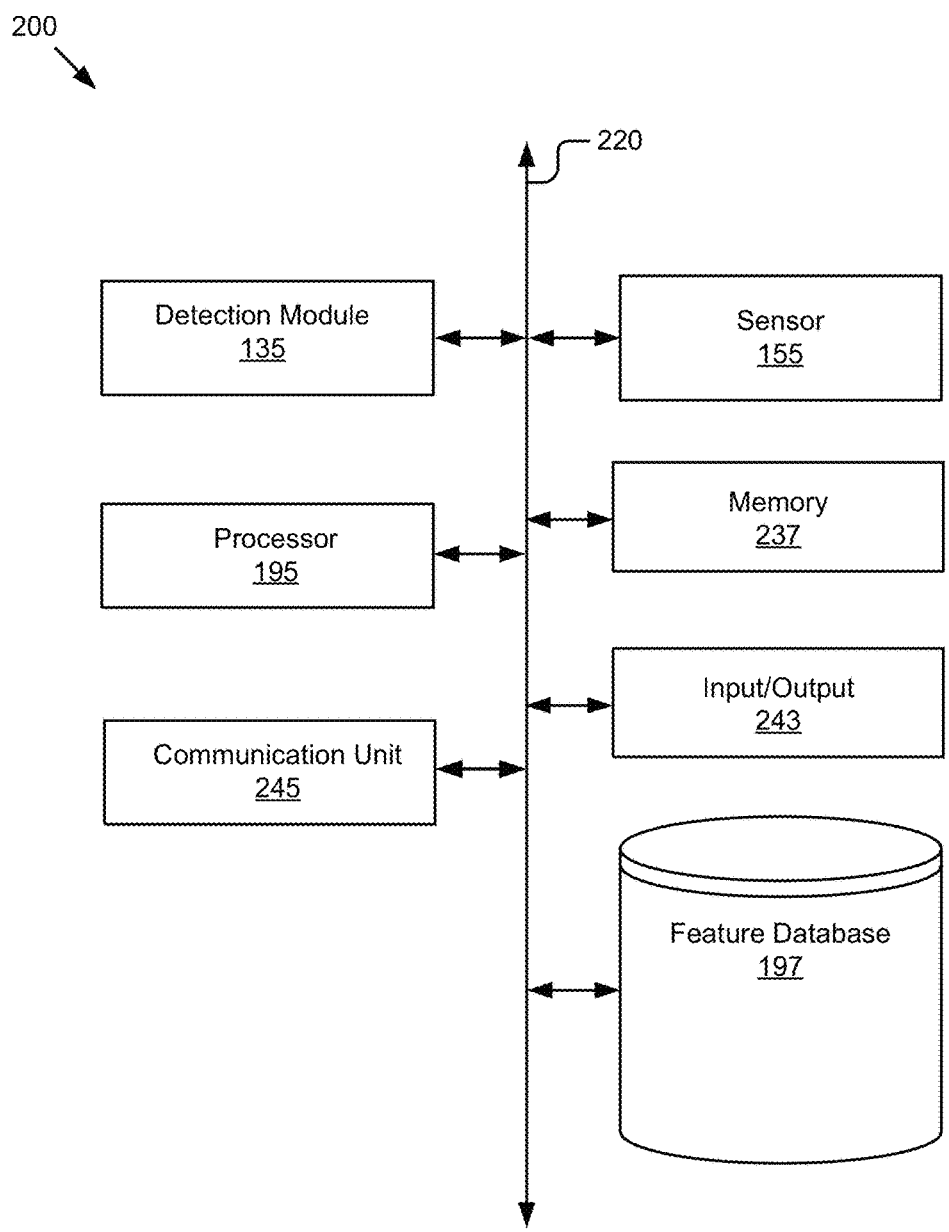
FIG. 2A is a block diagram of an example computing device.

The computation unit 115 may include any processor-based computing device, such as the computing device 200 depicted in FIG. 2A. In an embodiment, the computation unit 115 may receive sensor data from the sensor(s) 155, process the sensor data, generate and/or provide results for presentation via the interface 174 based on the processing, trigger various programs based on the processing, control the behavior and/or movement of the detection system 103 or associated systems based on the processing, cooperate with the computation server 101 to process the sensor data, etc., as described elsewhere herein. In some embodiments, the computation unit 115 may store the processed sensor data and/or any results processed therefrom in the feature database 197. The processor 195 and the detection module 135 are described in detail with reference to at least FIGS. 2A-12C.

The interface 175 is a device configured to handle communications between the user 125 and the computation unit 115. For example, the interface 175 includes one or more of a screen for displaying detection information to the user 125; a speaker for outputting sound information to the user 125; a microphone for capturing sound and/or voice commands; indicators (e.g., LEDs), and any other input/output components facilitating the communications with the user 125. In some embodiments, the interface 175 is configured to transmit an output from the computation unit 115 to the user 125. For example, the interface 175 includes an audio system for playing a voice greeting to the user 125 responsive to the computation unit 115 detecting that the user 125 is within the vicinity. It should be understood that the interface 175 may include other types of devices for providing the functionality described herein.

The user 125 may be a human user. In one embodiment, the user 125 is driver or a passenger sitting in a vehicle on a road. In another embodiment, the user 125 is a human located within a premises that interacts with a robot. In a further embodiment, the user is a conventional user of a computing device. The user 125 may interact with, or otherwise provide inputs to and/or receives outputs from, the interface 175 which sends and receives different types of data to and from the computation unit 115.

The feature database 197 is stored in a non-transitory storage medium/media, such as one or more a static random access memory (SRAM) devices, flash memories, hard disk drives, disk-based memory devices (e.g., CD, DVD, Blue-Ray™, floppy, etc.), or some other known volatile or non-volatile physical storage device. The feature database 197 may be included in the detection system 197 or in another computing device and/or storage system distinct from but coupled to or accessible by the detection system 197. In some embodiments, the feature database 197 may store data in association with a database management system (DBMS) operable by the detection system 103 and/or the computation server 101. For example, the DBMS could include a structured query language (SQL) DBMS, a NoSQL DMBS, flat file system, conventional file system, etc. In some instances, the DBMS may store data in multi-dimensional tables comprised of rows and columns, and manipulate, i.e., insert, query, update and/or delete, rows of data using programmatic operations. Further aspects of the feature database 197 are discussed below.

The computation server 101 is any computing device having a processor (not pictured) and a non-transitory computer-readable storage medium (e.g., a memory) (not pictured) to facilitate the detection system 103 to detect and recognize objects. In some embodiments, the computation server 101 includes an instance 135 of the detection module. In network-based embodiments, the computation server 101 may receive sensor data, recognition data, location data, and/or any other data discussed herein, from the detection system 103 and/or other relevant information sources, processes the data, and sends required results of processing to the detection system 103.

FIG. 2A is a block diagram of a computing device 200 that includes a detection module 135, a processor 195, a memory 237, a communication unit 245, a sensor(s) 155, and a feature database 197 according to the illustrated embodiment. The components of the computing device 200 are communicatively coupled by a bus 220. In some embodiments, the computing device 200 is representative of the architecture of a detection system 103 and/or a computation server 101.

The memory 237 may store and provide access to data to the other components of the computing device 200. In some implementations, the memory 237 may store instructions and/or data that may be executed by the processor 195. For instance, the memory 237 may store the detection module 135 and/or components thereof. The memory 237 is also capable of storing other instructions and data, including, for example, an operating system, hardware drivers, other software applications, databases, etc. The memory 237 may be coupled to the bus 220 for communication with the processor 195 and the other components of the computing device 200.

The memory 237 includes one or more non-transitory computer-usable (e.g., readable, writeable, etc.) media, which can include an apparatus or device that can contain, store, communicate, propagate or transport instructions, data, computer programs, software, code, routines, etc., for processing by or in connection with the processor 195. In some implementations, the memory 237 may include one or more of volatile memory and non-volatile memory. For example, the memory 237 may include, but is not limited to, one or more of a dynamic random access memory (DRAM) device, a static random access memory (SRAM) device, a discrete memory device (e.g., a PROM, FPROM, ROM), a hard disk drive, an optical disk drive (CD, DVD, Blue-Ray™, etc.). It should be understood that the memory 237 may be a single device or may include multiple types of devices and configurations.

The communication unit 245 transmits data to and receives data from other computing devices to which it is communicatively coupled using wireless and/or wired connections. The communication unit 245 may include one or more wired interfaces and/or wireless transceivers for sending and receiving data. The communication unit 245 may couple to the network 105 and communicate with other computing nodes, such as the detection system 103 and/or the computation server 101 (depending on the configuration). The communication unit 245 may exchange data with other computing nodes using standard communication methods, such as those discussed above regarding the network 105.

The detection module 135 may be coupled to the sensor(s) 155 to receive sensor data. In some embodiments, the sensor data received from the sensor(s) 155 may include depth data describing a depth image. The depth image may be an image depicting a scene including one or more objects. An object may be a living or a non-living object, an animate or inanimate object, etc. Example objects include but are not limited humans, animals, furniture, fixtures, cars, utensils, etc.

Figure 2B:
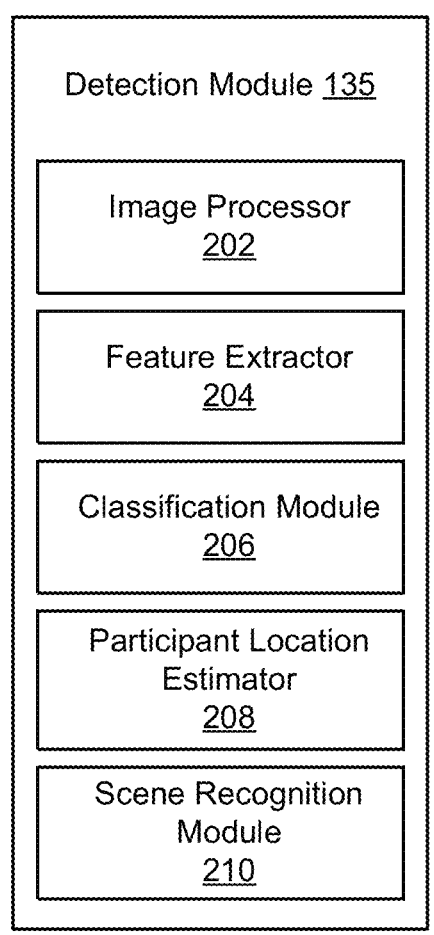
FIG. 2B is a block diagram of an example feature module.

As shown in FIG. 2B, which depicts an example detection module 136, the detection module 136 may include an image processor 202, a feature extractor 204, a classification module 206, a participant location estimator 208, and a scene recognition module 210, although it should be understood that the detection module 136 may include additional components and/or that various components may be combined into a single module or divided into additional modules.

The image processor 202, the feature extractor 204, the classification module 206, the participant location estimator 208, and/or the scene recognition module 210 may be implemented as software, hardware, or a combination of the foregoing. In some implementations, the image processor 202, the feature extractor 204, the classification module 206, the participant location estimator 208, and/or the scene recognition module 210 may be communicatively coupled by the bus 220 and/or the processor 195 to one another and/or the other components of the computing device 200. In some implementations, one or more of the components 135, 202, 204, 206, 208, and/or 210 are sets of instructions executable by the processor 195 to provide their functionality. In further implementations, one or more of the components 135, 202, 204, 206, 208, and/or 210 are stored in the memory 237 and are accessible and executable by the processor 195 to provide their functionality. In any of the foregoing implementations, these components 135, 202, 204, 206, 208, and/or 210 may be adapted for cooperation and communication with the processor 195 and other components of the computing device 200.

Further structure, acts, and/or functionality of the image processor 202, the feature extractor 204, the classification module 206, the participant location estimator 208, and/or the scene recognition module 210 are discussed below with reference to at least FIGS. 3-9.

Figure 3:
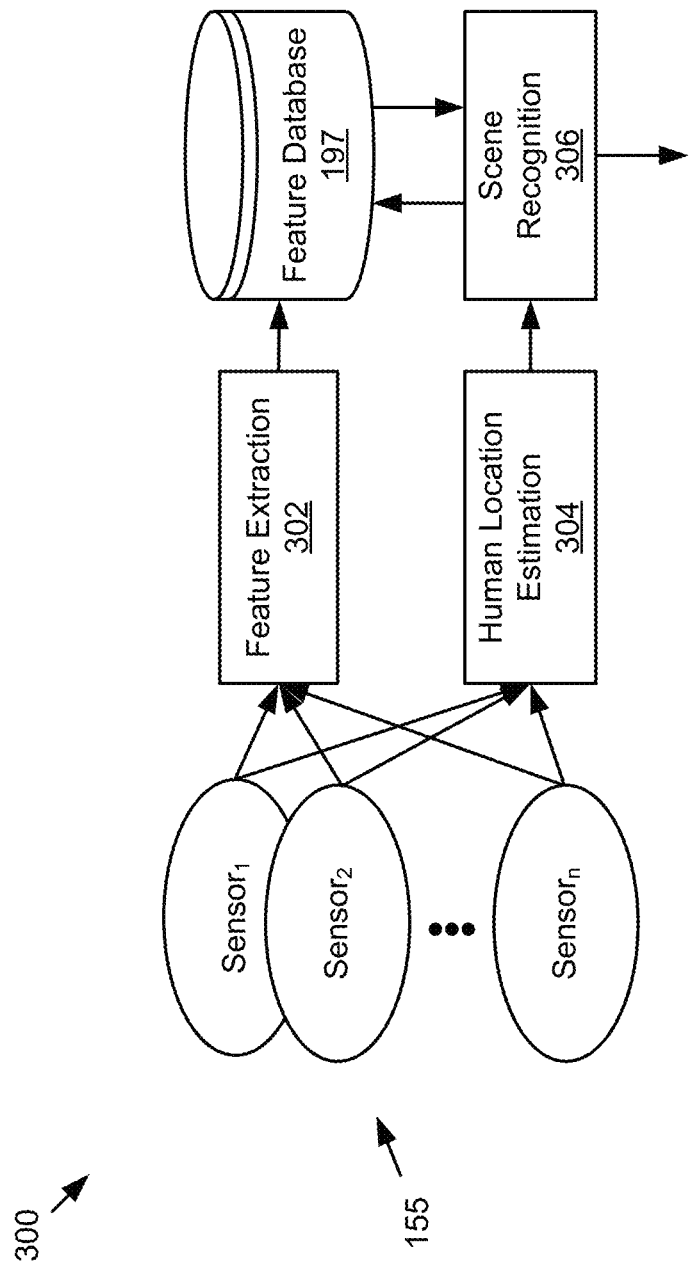
FIG. 3 is a flowchart of an example process for recognizing a scene based on extracted features and human location estimation.

FIG. 3 is a flowchart of an example process for recognizing a scene based on extracted features and human location estimation. As shown, when a detection system, such as a robot, is interacting with a participant, such as a human, it uses the detected position of the participant to query a database of accumulated evidence about the target environment. The detection system 103 may include and/or cooperation with a participant detection/tracking system. In some cases, this is embodied by the participant location estimator 208. The participant's location, as referred to herein, may be the participant's current detected location, or the expected location at some point in the future given the current velocity of the tracked participant. The participant location estimator 208 is configured to detect n-dimensions of the participant as needed for searching the database. These n-dimensions are referenced with respect to or reconcilable with the same origin as the features are other items stored in the feature database 197.

The position of the participant may be detected in a number of different ways. In some embodiments, the participant location estimator 208 may process image data captured by a sensor 155, which includes the participant in the frame, to determine the location of the participant relative to a known reference point, as discussed elsewhere herein. In further embodiments, the participant may be carrying a device capable of determining location information, such as portable electronic device (e.g., wearable, cell phone, tablet, laptop, etc.) equipped with a location sensor (e.g., GPS sensor), or capable of receiving and providing location information determined by a third-party based on an IP address of that device or multilateration or triangulation performed on the device by the third-party. In these embodiments, the participant's device may be programmed to transmit the location data via the network 105 (e.g., PAN, LAN, WAN, etc.) to the detection system 103 or the computation server 101, and the participant location estimator 208 may receive the location data via the communication unit 245 and process it to estimate the participant's location.

Once the participant's location is estimated in block 304, the detection system 103 computes in block 306 how to interact with the participant using the scene recognition methods disclosed by this document. Determining the place, or more specifically the scene(s) most probable to be immediately relevant to the participant, provides valuable data about the proper method of interaction that should be carried out by the detection system 103 (e.g. what specific information to convey to the participate or what information to request from the participant, how to execute a difficult approach, the types of tasks a participant might currently require of the detection system 103, etc.).

Without more, sensor data collected in the vicinity of the person, however, is often insufficient for accurate place recognition for at least one or more of the following reasons:

The participant may be located next to or within an environment of inadequate complexity for classification (e.g. a camera directed toward a wall, a microphone located in a quiet room, etc.).

The participant may be standing in the boundary region between two rooms, where classification from a directional sensor will change with the direction the sensor is facing.

The room in which the participant is located may have multiple uses (depending on the time of day, different parts of the room may serve different purposes, etc.), and the correct answer depends upon where in the room the participant is located and/or the time of day the participant is located there.

For each of these cases the solutions described in the background section are inadequate at least because the correct approach depends not on what the sensor can currently see, but rather on where the target participant(s) of the interaction are located within the environment. The approach depicted in FIG. 3 and described through this document solves this problem by detecting and tracking the participant's location and uses the location to query a database 197 of features extracted from sensor data captured within the environment. In particular, one or more sensors 155 capture different sets of sensor data. In block 302, the feature extractor 204 is configured to extract the features of the environment from the sensor data. The classification module 206 is configured to classify the features into scene types using probability scores. Feature data describing the extracted features and classification data reflecting the probability scores are stored in the feature database 197 in association with one another and the environment.

Figure 4:
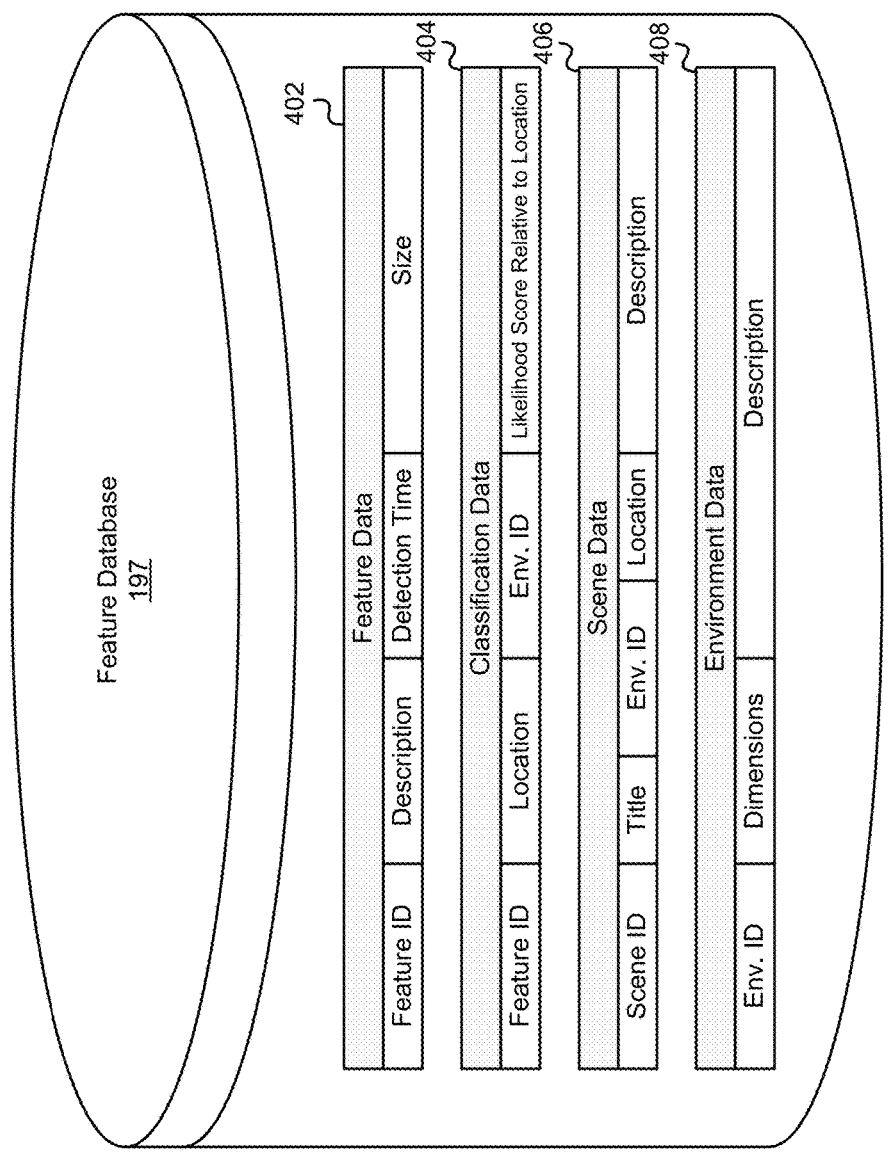
FIG. 4 is a diagram of example feature-related data stored in a feature database.

FIG. 4 is a diagram of example feature-related data stored in the feature database 197. As shown, the feature database 197 may store feature data 402, classification data 404, scene data 406, and environment data 408.

The feature database 197 database may be populated in a multitude of ways. For example, the detection system 103

(e.g., a robot), may be programmed to autonomously self-explore the environment, during which the detection system 103 utilizing its sensors 155, may capture sensor data of the different aspects of the environment. The feature extractor 204 may process the sensor data and extract the features, and populate the feature database 197 with the extracted features. In another example, multiple disparate sensors, such as fixed sensors installed in the environment, sensors 155 of one or more detection systems 103, sensors included in other devices in the environment (e.g., appliances, building controls, security systems, user electronics (e.g., portable electronic devices), etc., may capture and provide sensor data via the network 105 to the detection system 103 and/or the computation server 101 for processing by the feature extractor 302, provided these sets of sensor data, and/or the features extracted from the, can be reconciled (e.g., captured from the same reference point, scaled to match, stored with respect to the same origin, etc.).

The feature data 402 may include a multiplicity of features that were detected in and pertinent to a particular environment. In one example, a feature is a point in a point cloud. For instance, when a cloud of M points is returned by an RGB-D sensor, the feature/scene is classified using either the point cloud or a separate sensor, and M features corresponding to each 3D point in the cloud are recorded along with the resulting classification score.

In another example, a feature reflects a physical object in the environment like a piece of furniture or a detected cup or plate. Each object has a physical location in three dimensions, and associated size, and even a relevant detection time. Furthermore, each object has a likelihood of being found in each of the different types of scenes. For example, a plate is most often found in a kitchen or dining area, and its presence would imply one of those environments.

In some embodiments, a feature is associated with a classification score. The classification score describes the probability of that feature belonging to a particular scene type recognized by the classifier, a prior probability of classifying the scene correctly using that feature, an N-dimensional location with respect to an arbitrary reference point, and a size.

As shown, each feature may be provided with a unique identifier, such as a feature ID, for tracking and retrieval purposes. Various aspects of each feature may be stored, such as a description of the feature, the time or times of day that the feature would be located in the environment (as well as any dates that the feature would be located in the environment if not every day), the size of the feature, and the location(s) of the feature within the environment.

The classification data 404 indexes locations within one or more cataloged environments, features associated with the locations, and likelihood scores reflecting the likelihoods of the features existing within those locations. In some embodiments, certain locations within the environment may be prefetched and populated with seed data (initial likelihood numbers) that can be updated over time as additional information about the environment is captured. As data describing additional locations, features, etc., for a given environment are captured, the classification data may be updated with more current information, such as more relevant likelihood scores for existing features and locations, new likelihood scores for new features and locations, etc.

In the depicted example, the classification data may associate the feature ID of each feature with each location (which maybe represented using 2D, 3D, etc., coordinates or other suitable unique identifying information), the likelihood score describing the likelihood of the feature associated with that feature ID existing within the location. Additionally, as more than one environment may be processed by a given detection system 103, for data integrity purposes, the feature ID and the location may be keyed to the environment ID of the specific environment from which the features were extracted.

The scene data 406 can include a unique identifier for each scene type, as well as a title and description for each scene type and the environment data can include a unique identifier for any environments being monitored by the detection system 103, dimensions of each environment, and a description of each environment. The scene types may be predetermined to reflect any specific scene that a participant may find oneself in, may be machined learned (e.g., by a robot, a group of robots, a server system in communication with one or more robots, etc.). Example scene types may include the different rooms of a dwelling, such as a home or an office, common outside locations, such as a bus stop, a courtyard, a sidewalk, a crosswalk, steps of a building, etc.

Figure 5:
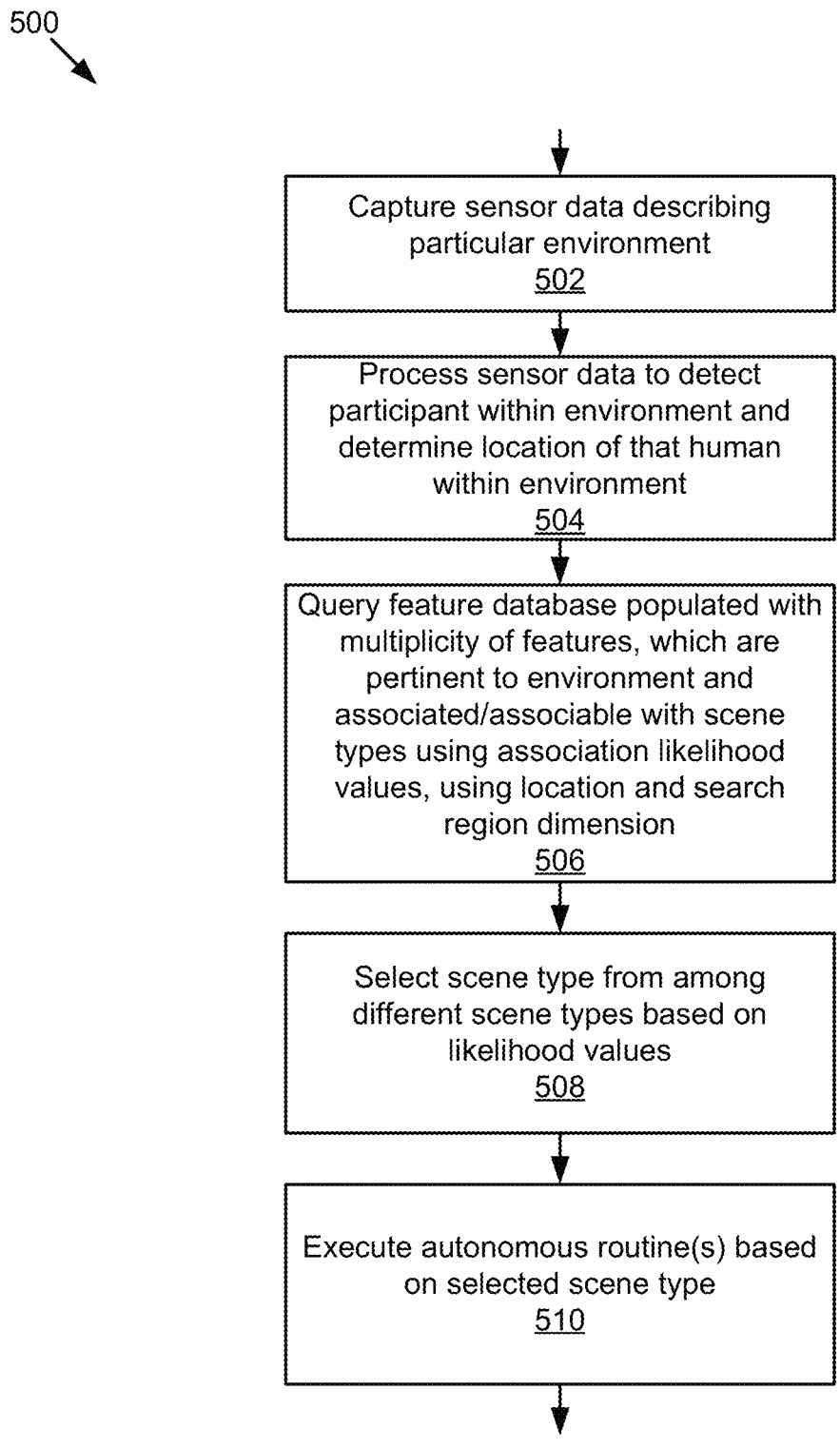
FIG. 5 is a flowchart of an example method for recognizing a scene.

FIG. 5 is a flowchart of an example method 500 for recognizing a scene. In block 502, the sensor(s) 155 capture sensor data describing a particular environment. The sensor data is provided to the feature extractor 202, and in block 504, the participant location estimator processes the sensor data to detect one or more interactive participant(s) within the environment and the location of that participant within the environment. Additionally or alternatively, the participant location estimator 208 may receive location data from other sources, such as third-party sources as discussed elsewhere herein, to determine the location of the participant within the environment.

In block 506, the scene recognition module 210, queries the feature database 197 populated with a multiplicity of features, which are pertinent to the environment and associated or associable with the scene types using association likelihood values (also called probability or likelihood scores), using the location and a search region dimension. In some embodiments, the likelihood values may be pregenerated and stored in the feature database 197 (e.g., as classification data). In further embodiments, the likelihood values may be generated for each scene type and/or updated at runtime.

In block 508, the scene recognition module 210 selects a scene type from among the different scene types based on the likelihood of values of the features located within the search region defined by the search region dimension.

In block 510, the detection module 135, executes one or more autonomous routines based on the selected scene type, which allows the detection system 103 to accurately and contextually interact with the participant. For example, in response to determining the scene type, the detection module 135 may trigger the operation of a program that performs operations based on the scene type, such as retrieval of information associated with the scene type, control of one or more output devices (e.g., displays, speakers, sensors, motivators, etc.) to interact with the participants and/or one or more of the features (e.g., greeting a user using the user's name), pulling up account information associated with the object (e.g., a specific person/user), etc., based on the scene type.

Figure 6:
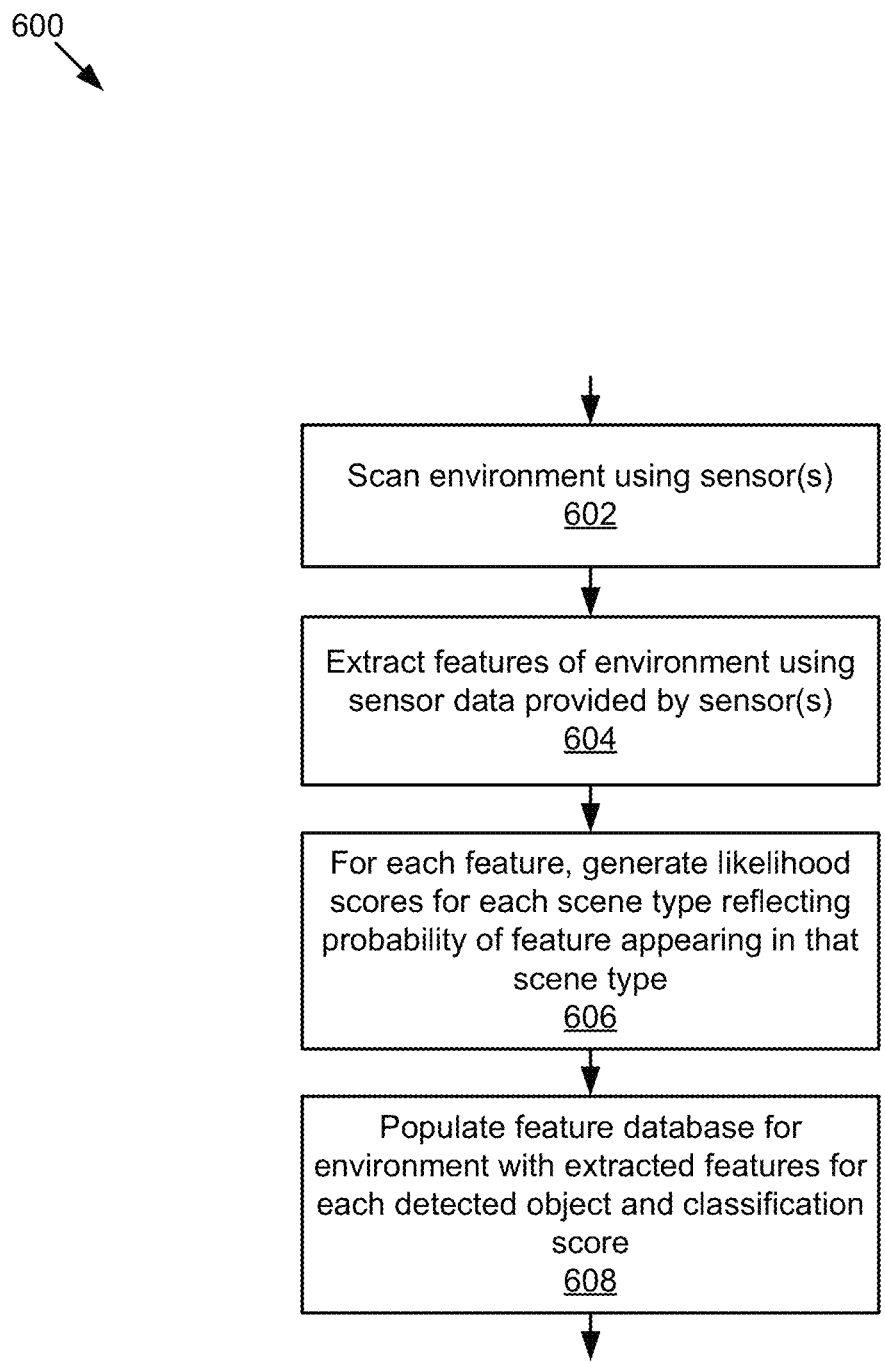
FIG. 6 is a flowchart of an example method for extracting features of a particular environment, classifying the features, and populating a feature database with the classified features.

FIG. 6 is a flowchart of an example method 600 for extracting features of a particular environment, classifying the features, and populating a feature database with the classified features. In block 602, the image processor 202 may scan the particular environment using the sensor(s) 155. Upon receiving sensor data from the sensor(s), the image processor 202 processes the sensor data for objects.

The image processor 202 may be communicatively coupled to the sensor(s) 155 to receive and process the sensor data, and provide the processed sensor data to the feature extractor 204 and the participant location estimator 208 for further processing and discussed elsewhere herein. In some embodiments, the sensor data may include depth image data describing the position of the objects relative to a point of reference. For example, the sensor(s) 155 may include a multi-dimensional depth sensor that generates multi-dimensional (e.g., 3D) data describing a depth image including object(s) captured by the sensor(s) 155. The depth image data may include RGB values for the pixels forming the object(s) in the image. In some cases, the depth image data may include positional information associated with the object(s), such as a multi-dimensional (e.g., 3D) depth point cloud in form of an array of triplets or spatial coordinates. In some cases, the depth image data may include the column and row number of each pixel represent its X and Y coordinates and the value of the pixel represents its Z coordinate.

The image processor 202 may use the depth image data describing the depth images captured by the sensor(s) 155 to determine the discrete object(s) included in the depth images. Using depth imaging can provide various advantages including simplifying object segmentation. In depth images, objects can often be separated from each other in the image by their relative depth. For instance, two adjacent pixels having the same relative distance (as measured from a given point of reference such as the sensor(s) 155 location) are likely to belong to the same object, but two pixels having significantly different distances relative to the point of reference likely belong to different objects in the image. This can be helpful to more easily distinguish freestanding objects from one another.

In block 604, the feature extractor 204 extracts features of the environment using the sensor data provided by the sensor(s) 155 and processed by the image processor 202. For example, the feature extractor 204 may receive object data describing the objects in the sensor data from the image processor 202, and may further process the object data and the sensor data to extract features embodying the objects and/or associated with the objects, such the location of the features relative to a point of reference, size of the features, location time of the features, location frequency of the features, other descriptive information about the features, etc.

In block 606, the classification module 206 generates a likelihood score for each feature relative to each scene type. The likelihood score reflects the probability of that feature appearing in that scene type. An example method for generating the likelihood score is described below with reference to FIG. 7.

After the likelihood scores are generated, in block 608, the classification module 206 populates the feature database 197 for the environment with the extracted features for each detected object and the classification scores for the features relative to the scene types, as discussed further elsewhere herein.

In some embodiments, each feature has a two and/or three dimensional feature specification, and may also have time as an additional attribute (search criteria). This is advantageous as it can increase result resolution. For example, multipurpose spaces (e.g., rooms) may change over time. A space with tables is a convenient meeting space for most of the day, and object-based or even real-time image/audio classification may correctly categorize it as such. However, at lunchtime, it may serve as a dining space and the presence of food and plates and other objects commonly associated with eating (e.g., see FIG. 8) affects the assigned classification score. Searching the database by both participant location (or participant location-based search area) and time may allow for a more nuanced, and thus more accurate, categorization of an otherwise difficult to describe multi-purpose environment.

In some embodiments, the feature database 197 can be used to generate place recognition gradients in the vicinity of the detected participant(s). If features indicative of one particular place type, e.g. kitchen, are randomly distributed about the participant's location, then the gradient generated by the scene recognition module 210 shows minimal directionality of kitchen "likeness". However, if the scene results for kitchen are dominated by features on one side of the person, i.e. not randomly distributed, then the gradient shows strong directionality towards the dominant features. The scene recognition module 210 uses gradients to identify transition regions and thereby control the behavior of the detection system 103 as it interacts with the participant.

For instance, the directionality determined by the scene recognition module 210 can assist a robot seeking context for an interaction. A person located near regions strongly associated with one particular scene is often in that vicinity to make use of those areas. By following the local gradient with a directional sensor (e.g. camera) or focus of an attention mechanism, the robot may identify the environmental context for a dialogue with a person or improve its ability to recognize the human activity, as discussed elsewhere herein, for example with respect to FIG. 8.

Figure 7:
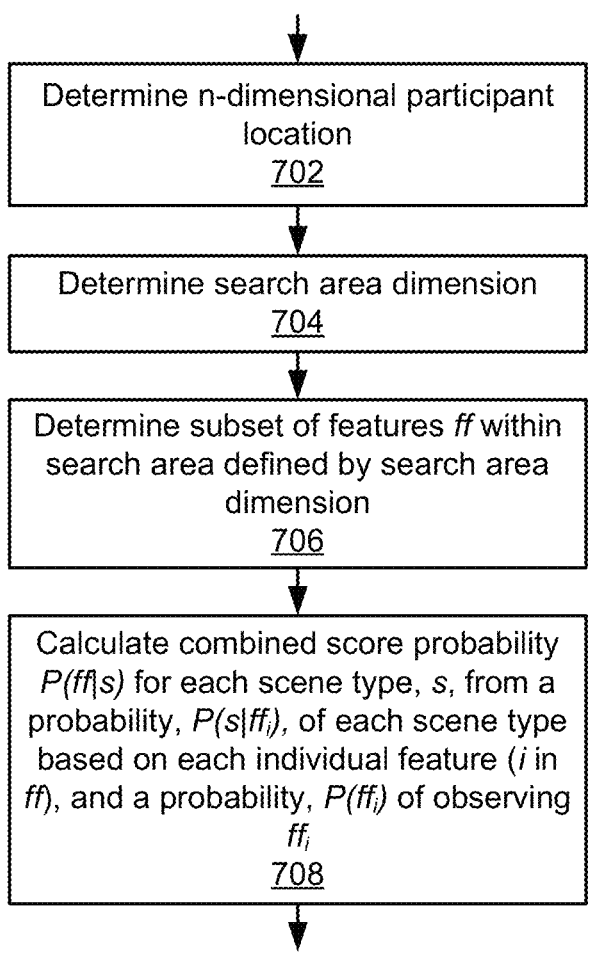
FIG. 7 is a flowchart of an example method for calculating a score.

FIG. 7 is a flowchart of an example method 700 for calculating a score. As shown, in block 702, the participant location estimator 208 determines an n-dimensional participant location as discussed elsewhere herein and, in block 702, the scene recognition module 210 determines a search area dimension. In some embodiments, the search area dimension may be specified at runtime or compile time, as considered most appropriate for the application. In some further embodiments, the scene recognition module 210 computes an adaptive search area dimension, beginning with an initial dimension to query the database for features whose location satisfy that dimension, and the if the results remain ambiguous (i.e. low confidence relative to a predetermined threshold or minimal salient features in the vicinity of the participant relative to a predetermined threshold), the dimension may be increased (or reduced as the case may be) until a certain threshold (minimum, maximum, etc.) is achieved. An example of a search area dimension may be a search radius, although it should be understood that the search area may take other forms (polygonal, elliptical, discontinuous, etc.) and the dimension may describe multiple aspects of the area sufficient to determine its boundaries.

Next, in block 706, the method 700 determines a subset of features, ff, within the search area defined by the search area dimension. In some embodiments, the scene recognition module 210 queries the feature database 197 for features contained within an area defined by the search area dimension. The features may be indexed by size and location within the environment relative to a certain point of reference, and the query may specify the area of interest based on the search area dimension.

Figure 8:
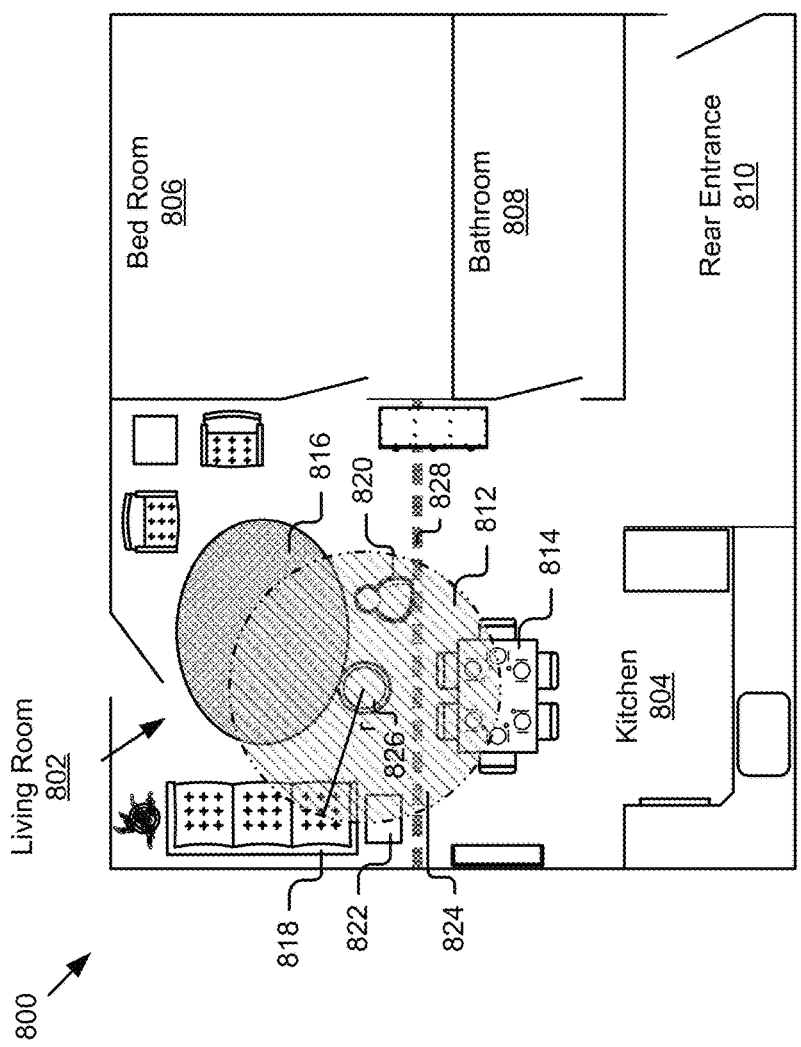
FIG. 8 is an example diagram of a premises including an autonomous robot recognizing a scene.

FIG. 8 provides a further example of the search area and the features contained within. In particular, FIG. 8 depicts a premises 800 including an autonomous robot 826 recognizing a scene. The premises 800 is a residence. The participant 820 is located within the residence between the living room 802 and kitchen 804 the residence includes a number of other rooms, such as the bedroom 806, the bathroom 808, and the washroom, rear entrance 810. Scene types for each of these rooms are predefined and stored for access by the autonomous robot 826, which in this case reflects a detection system 103.

The living room 802 includes typical objects that would be contained in a living room, such as a sofa 818, a side table 822, a rug 816, etc. Similarly, the kitchen 804 includes various objects that would be in a typical kitchen, such as a dining table 814, which is set with dinnerware since it is about dinnertime in this example.

The robot 826 is located near the interactive participant 820. The robot 826 is tracking the position of the participant 820, who is moving from/transitioning between the living room 802 where the kitchen 804. This transition as reflected by the dotted line 828. Since the robot 826 has determined that the participant 820 is moving, the scene recognition module 210 of the robot 826 queries the feature database 197 for features within the search area defined by radius r that are located in the vicinity that the participant 820 is moving towards, which in this case is the dining table 814 set with dinnerware. In the feature database 197, the dining table 814 as an 85% probability of being located within the kitchen 804, and the dinnerware has a 95% probability of being located in the kitchen. In contrast, the dining table 814 is a 45% probability of being located in the living room 802, and the dinnerware has a 25% probability of being located in the living room 802 (e.g., sometimes the participant eats on the couch, for example). Utilizing these values and/or other variables (e.g., time, prior history, etc.), the scene recognition module 210 determines that the user is heading towards the kitchen. Responsive to this determination, the detection module 135 determines a software routine to control the behavior of the robot 826 based on the determination that the user is heading towards the kitchen. For example, the robot 826 may ask the participant 820 is guidance is needed towards the refrigerator or the sink, if information for preparing dinner is required, or if any other people need to be summoned to the table.

Returning to FIG. 7, in block 708, the subset of features, ff, within the specified radius of the human location are identified, the method 700 calculates, using the below equation, the combined scene probability, P(ff|s), for each scene type, s, from P(s|ff$_i$), the probability of each scene type given individual features, i in ff and the probability of observing ff$_i$.

$$P(f\!f \mid s) = \eta \prod_i P(s \mid f\!f_i) P(f\!f_i)$$

Figure 9:
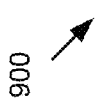
FIG. 9 is a table depicting various non-limiting advantages of the novel human-centric place recognition technology disclosed herein.

Additional advantages of the human-centric place recognition technology described herein relative to other approaches, such as those discussed in the Background, are summarized in the table 900 in FIG. 9.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method comprising:
   capturing sensor data using one or more sensors describing a particular environment;
   processing the sensor data using one or more computing devices coupled to the one or more sensors to detect a participant within the particular environment;
   determining a location of the participant within the particular environment using depth image data, the depth image data describing at least a depth of points in the particular environment relative to the one or more sensors;
   querying a feature database populated with a multiplicity of features extracted from the particular environment using the location of the participant for one or more features located within a search area defined by a search area dimension relative to the location of the participant, the one or more features representing one or more physical objects in the particular environment, the search area dimension including at least the depth based on the depth image data; and
   selecting, using the one or more computing devices, a scene type from among a plurality of predetermined scene types based on association likelihood values describing probabilities of each feature, of the one or more features located within the search area defined by the search area dimension relative to the location of the participant, being located within the scene type selected from among the plurality of predetermined scene types.

2. The computer-implemented method of claim 1, further comprising:
   executing one or more autonomous routines based on the selected scene type.

3. The computer-implemented method of claim 1, further comprising:
   generating the association likelihood values based on times of day.

4. The computer-implemented method of claim 1, wherein the association likelihood values are classification scores respectively describing the probabilities of each feature being located within the scene type, prior probabilities of classifying the scene types correctly using the features, N-dimensional locations with respect to an arbitrary reference point, and sizes.

5. The computer-implemented method of claim 1, wherein the association likelihood values are probabilities computed using a combined scene probability for each scene type.

6. The computer-implemented method of claim 1, further comprising:
   prior to querying the feature database, scanning the particular environment using the one or more sensors;
   extracting the multiplicity of features of the particular environment using sensor data provided by the one or more sensors responsive to scanning the particular environment; and
   populating the feature database with the multiplicity of features.

7. The computer-implemented method of claim 1, wherein selecting the scene type includes generating a gradient for an area in a vicinity of the participant, determining a directionality based on the gradient, and selecting the scene type further based on the directionality of the gradient.

8. The computer-implemented method of claim 1, wherein at least one of the one or more sensors is an RGB-D camera.

9. The computer-implemented method of claim 1, wherein the participant is a human.

10. An autonomous computing system comprising:
one or more processors; and
one or more memories storing instructions that, when executed by the one or more processors, cause the system to perform operations comprising:
capturing sensor data using one or more sensors describing a particular environment,
processing the sensor data using one or more computing devices coupled to the one or more sensors to detect a participant within the particular environment,
determining a location of the participant within the particular environment using depth image data, the depth image data describing at least a depth of points in the particular environment relative to the one or more sensors,
querying a feature database populated with a multiplicity of features extracted from the particular environment using the location of the participant for one or more features located within a search area defined by a search area dimension relative to the location of the participant, the one or more features representing one or more physical objects in the particular environment, the search area dimension including at least the depth based on the depth image data, and
selecting, using the one or more computing devices, a scene type from among a plurality of predetermined scene types based on association likelihood values describing probabilities of each feature, of the one or more features located within the search area defined by the search area dimension relative to the location of the participant, being located within the scene type of the plurality of predetermined scene types.

11. The system of claim 10, wherein the instructions, when executed by the one or more processors, further cause the system to perform operations comprising:
executing one or more autonomous routines based on the selected scene type.

12. The system of claim 10, wherein the instructions, when executed by the one or more processors, further cause the system to perform operations comprising:
generating the association likelihood values.

13. The system of claim 10, wherein the association likelihood values are classification scores respectively describing the probabilities of each feature being located within the scene type, prior probabilities of classifying the scene types correctly using the features, N-dimensional locations with respect to an arbitrary reference point, and sizes.

14. The system of claim 10, wherein the association likelihood values are probabilities computed using a combined scene probability for each scene type.

15. The system of claim 10, wherein the instructions, when executed by the one or more processors, further cause the system to perform operations comprising:
prior to querying the feature database, scanning the particular environment using the one or more sensors,
extracting the multiplicity of features of the particular environment using sensor data provided by the one or more sensors responsive to scanning the particular environment, and populating the feature database with the multiplicity of features.

16. The system of claim 10, wherein selecting the scene type includes generating a gradient for an area in a vicinity of the participant, determining a directionality based on the gradient, and selecting the scene type further based on the directionality of the gradient.

17. The system of claim 10, wherein at least one of the one or more sensors is an RGB-D camera.

18. The system of claim 10, wherein the participant is a human.

19. The computer-implemented method of claim 1, wherein the search area dimension relative to the location of the participant includes a defined distance from the location of the participant.

20. The system of claim 10, wherein the search area dimension relative to the location of the participant includes a defined distance from the location of the participant.

* * * * *